(12) United States Patent
Hoff et al.

(10) Patent No.: US 8,300,414 B2
(45) Date of Patent: *Oct. 30, 2012

(54) CONNECTION OF A SYSTEM MODULE TO AN ELECTRONIC DEVICE

(75) Inventors: Greg M. Hoff, Fort Wayne, IN (US); Dan Leeuw, Fort Wayne, IN (US); Ed Poorman, Fort Wayne, IN (US)

(73) Assignee: Exelis Inc., McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/080,819

(22) Filed: Apr. 6, 2011

(65) Prior Publication Data

US 2011/0188212 A1   Aug. 4, 2011

Related U.S. Application Data

(63) Continuation of application No. 11/617,778, filed on Dec. 29, 2006, now Pat. No. 7,969,746.

(60) Provisional application No. 60/846,364, filed on Sep. 22, 2006.

(51) Int. Cl.
    *H05K 7/00* (2006.01)
(52) U.S. Cl. ....................................... 361/747; 361/729
(58) Field of Classification Search .................. 361/747, 361/732, 740, 752, 728–731, 796–802
See application file for complete search history.

(56) References Cited

U.S. PATENT DOCUMENTS

| | | | |
|---|---|---|---|
| 4,401,351 A | 8/1983 | Record | |
| 4,969,830 A | 11/1990 | Daly et al. | |
| 6,008,985 A * | 12/1999 | Lake et al. | 361/679.32 |
| 6,272,016 B1 * | 8/2001 | Matonis et al. | 361/716 |
| 6,480,723 B1 * | 11/2002 | Davidson et al. | 455/557 |
| 6,752,276 B2 | 6/2004 | Rumney | |
| 6,784,570 B1 * | 8/2004 | Walls et al. | 307/150 |
| 6,975,511 B1 | 12/2005 | Lebo et al. | |
| 7,227,755 B1 * | 6/2007 | Arnold et al. | 361/729 |
| 7,969,746 B2 * | 6/2011 | Hoff et al. | 361/807 |
| 2004/0026345 A1 | 2/2004 | Rumney | |
| 2004/0214476 A1 | 10/2004 | Haas et al. | |
| 2006/0136622 A1 | 6/2006 | Rouvelin et al. | |

FOREIGN PATENT DOCUMENTS

| | | |
|---|---|---|
| EP | 0148765 A2 | 1/1985 |
| FR | 2793644 A1 | 5/1995 |
| WO | 2009023323 | 2/2009 |

OTHER PUBLICATIONS

EP Search Report for EP 07115526.1, dated Oct. 26, 2009.

\* cited by examiner

*Primary Examiner* — Yuriy Semenenko

(74) *Attorney, Agent, or Firm* — Edell, Shapiro & Finnan, LLC

(57) ABSTRACT

A system is provided that is securable to an electronic device. The system includes a module with a connection port that is configured to connect with a corresponding connection port of the electronic device. A securing structure is securable to portions of first ends of the module and electronic device to facilitate attachment of the module alongside the electronic device. When the module is attached to the electronic device with the securing structure, a side surface of the module engages with a corresponding side surface of the electronic device and the connection port of the module connects with the corresponding connection port of the connection device to establish an electrical connection between the module and the electronic device.

14 Claims, 7 Drawing Sheets

CONNECTION OF A SYSTEM MODULE TO AN ELECTRONIC DEVICE

CROSS REFERENCE TO RELATED APPLICATIONS

This application is a continuation of U.S. application Ser. No. 11/617,778, filed Dec. 29, 2006, and entitled "Connection of a System Module to an Electronic Device", which claims the benefit of U.S. Provisional Patent Application Ser. No. 60/846,364, filed Sep. 22, 2006, and entitled "Expansion Module for Enhancing Operation of a Legacy Communication Device," the entire contents of which are hereby incorporated by reference.

FIELD OF THE INVENTION

The invention relates to a module that connects with an existing electronic device (e.g., a communication device) to facilitate and/or enhance operation of the device.

BACKGROUND

The current approach for communication system expansion for U S military communications systems is to replace existing or legacy communication equipment with an entire new system. This is typically due to legacy equipment having been designed and optimized to support a single method of communicating (called a waveform), such that it becomes impractical to modify such legacy equipment to support other communication techniques. Historically, the designs of the legacy equipment have been primarily implemented with hardware circuitry that cannot be modified once the equipment has been fielded. Some portions of the designs have been implemented with microprocessors running software applications designed uniquely for the particular equipment.

With the adoption of software defined radios and the Government's Software Communication Architecture, those limitations will no longer constrain system upgrades. However, realization of that benefit necessitates the procurement and fielding of communication systems that employ these new approaches. These new systems are under development but are projected to be fielded at a significant weight, power usage, size, and cost.

Because legacy communication equipment is designed for specific waveform operation, adding new capabilities requires redesign and replacement of the original radio. Typically, the new capabilities are so different from the original that significant modifications to the supporting platform are also required, resulting in a cost that can be larger than the replacement radio. These platform modifications can include, for example, additional system connections, additional platform DC power conditioning (or duplication of the power conditioning in the replacement radio), replacement radio shock isolation/mounting tray unit, and others. Installation of the replacement system, with the necessary platform modifications, requires the platform served by the communication system be taken out of service and returned to a depot maintenance facility for the work to be performed.

It is desirable to provide a module that can connect with an existing or legacy communication device in such a manner that the module provides additional capabilities to the existing device without the need for wholesale removal and exchange of the existing device with a new device.

SUMMARY

In accordance with the present invention, a system is provided that is configured to be secured to an electronic device. The system comprises a module including a connection port that is configured to connect with a corresponding connection port of the electronic device, and a securing structure securable to a portion of a first end of the module and a portion of a first end of the electronic device to facilitate attachment of the module alongside the electronic device. The system is further configured such that, upon attaching the module to the electronic device with the securing structure, a side surface of the module engages with a corresponding side surface of the electronic device, and the connection port of the module connects with the corresponding connection port of the connection device to establish an electrical connection between the module and the electronic device.

In further accordance with the present invention, a method is provided of securing a module to an electronic device, where the electronic module includes a connection port that is configured to connect with a corresponding connection port of the electronic device. The method comprises aligning a first end of the module with a first end of the electronic device, and securing the module to the electronic device with securing structure that engages with portions of the first ends of the module and the electronic device. Upon attaching the module to the electronic device with the securing structure, a side surface of the module engages with a corresponding side surface of the electronic device and the connection port of the module connects with the corresponding connection port of the connection device so as to establish an electrical connection between the module and the electronic device.

The expansion module of the present invention mechanically and electrically fastens to an existing electronic device (e.g., a communication unit) in a relatively easy manner, utilizing a single fastener or securing structure and without the requirement for specialized tools or removal of the existing electronic device from its fielded location. Thus, the expansion module can be easily implemented for connection with an existing electronic device in the field of operation of the device, without the requirement of replacing the existing device with a new device. Thus, the existing mount for the vehicle does not need to be replaced to facilitate the addition of the expansion module to the existing device. The module can further be designed to enhance the operability and performance of the unit.

The above and still further features and advantages of the present invention will become apparent upon consideration of the following detailed description of a specific embodiment thereof, particularly when taken in conjunction with the accompanying drawings wherein like reference numerals in the various figures are utilized to designate like components.

DETAILED DESCRIPTION

Figure 1:
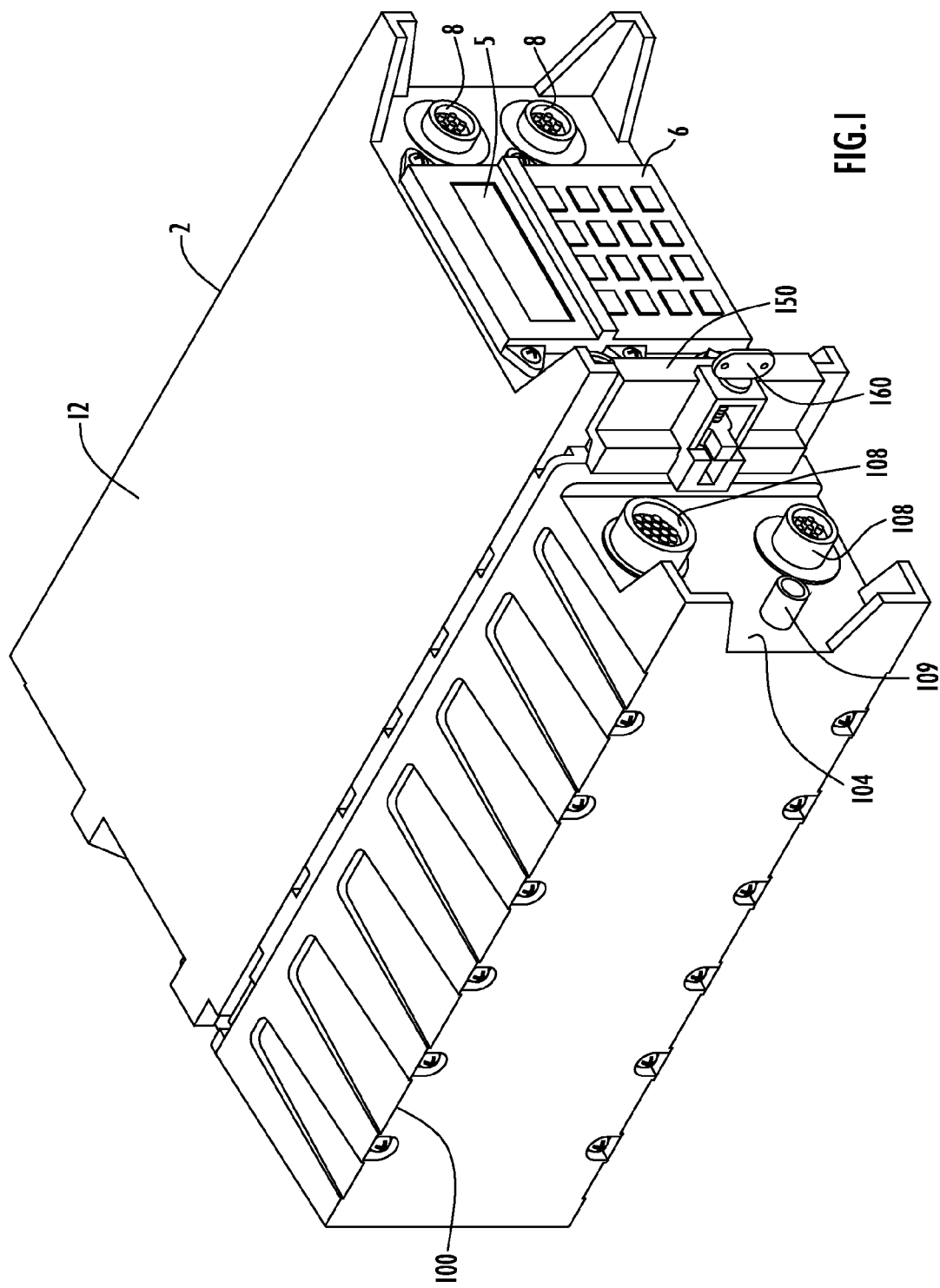
FIG. 1 is a view in perspective of an exemplary embodiment of an expansion or sidehat module secured to a SINCGARS radio in accordance with the present invention.

In accordance with the present invention, a system is provided including a module with a suitable securing structure or fastener that facilitates electrical and mechanical fastening of the module to an existing electronic device, such as a communication unit, without the requirement of tools or the requirement of modifying the existing mount for the existing electronic device in order to accommodate the additional module. The design of the mechanical connection between the module and the existing electronic device is sufficient to ensure that the module and device stay connected under severe shock and/or vibrational conditions. An electrical connection is further established between the module and the electronic device upon securing the two components to each other. In certain embodiments, the electrical connection facilitates communication between the two components and enhanced performance and operability of the electronic unit.

The system can include an expansion module that is particularly suitable for connection with an existing communication or radio unit that is secured or mounted in an existing structure (e.g., a mobile vehicle) such that the expansion module and communication unit exchange data. However, it is noted that the expansion module can be suitably configured to mechanically and electrically connect with any communication and/or other electronic device in the manner described below so as to facilitate electrical connection and/or communication between the expansion module and device to which it is connected and enhanced performance and operability of such device.

In an exemplary embodiment, the expansion module described herein provides the addition of a communications channel, via the expansion module, to existing or legacy communication systems employing Single Channel Ground and Airborne Radio System Advanced SINCGARS Improvement Program-Enhanced (SINCGARS ASIP-E) radios while utilizing the existing platform interfaces. The expansion module is configured to mount to the current SINCGARS radio, within the current shock isolation mount (e.g., a mount disposed within a military vehicle), where the expansion module shares the conditioned DC power source used by the SINCGARS radio. In addition, the expansion module includes suitable hardware and electronic circuitry that facilitates communication with the SINCGARS radio, upon connection of the module with the radio, and shares the platform voice intercommunications connection used by the SINCGARS radio. As noted above, the expansion module is configured to connect with the SINCGARS radio in a relatively easy manner and in such a way that the expansion module can be installed in the field, requiring only a short time to add the module and to replace the existing SINCGARS-only antenna with one that supports both SINCGARS and the waveforms provided by the added module.

An exemplary embodiment of an expansion module, also referred to herein as a "sidehat" module, is depicted in FIGS. 1-7, where the sidehat module electrically and mechanically fastens or connects to a SINCGARS RT-1523F radio using suitable connection equipment in accordance with the invention. However, as noted above, the expansion module of the present invention is not limited to connection with this specific radio, but rather can be connected with any selected number and types of different communication and/or other electronic equipment.

Figure 2:
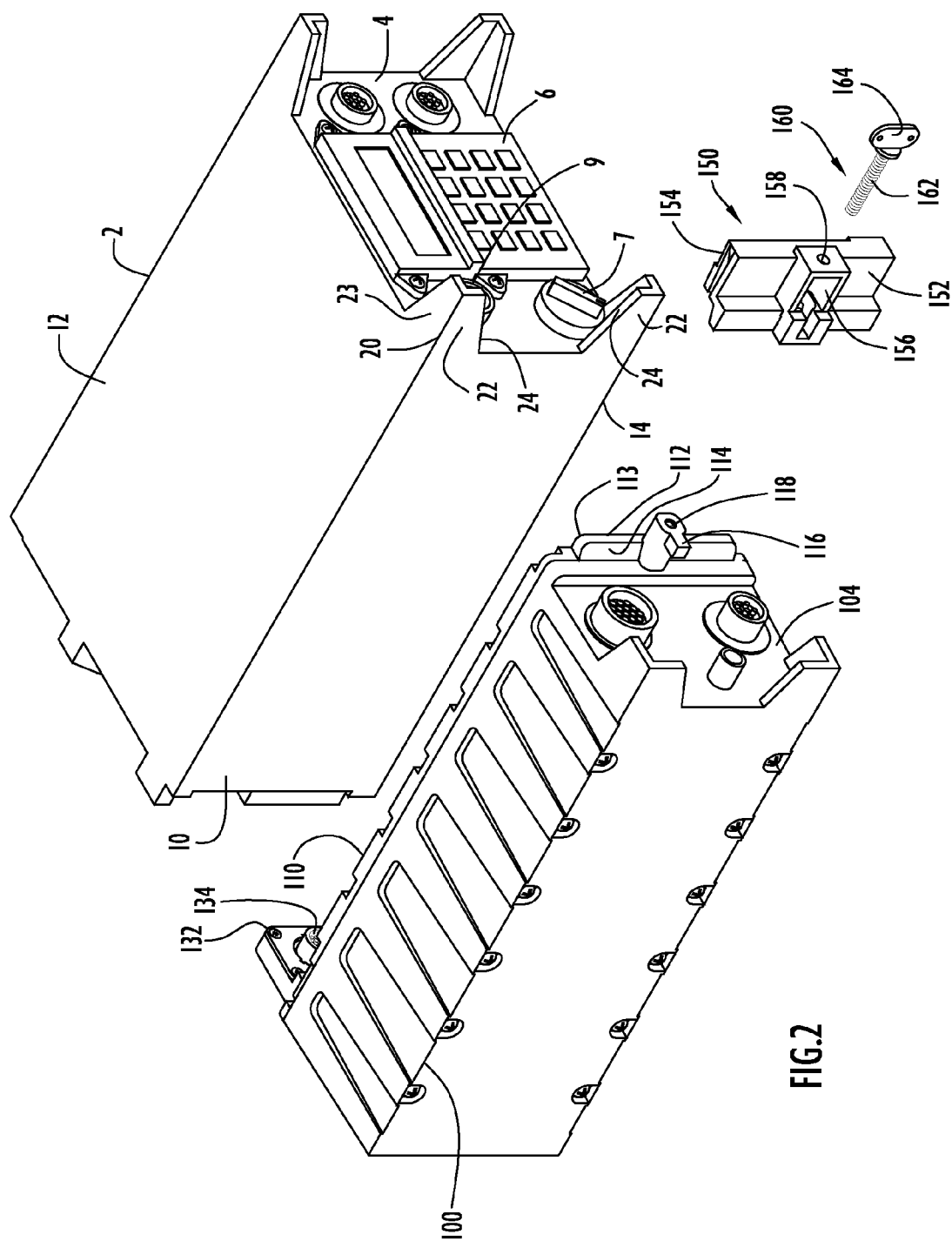
FIG. 2 is a view in perspective of the sidehat module, securing structure and radio of FIG. 1 with each of the components separated from each other.
Figure 3:
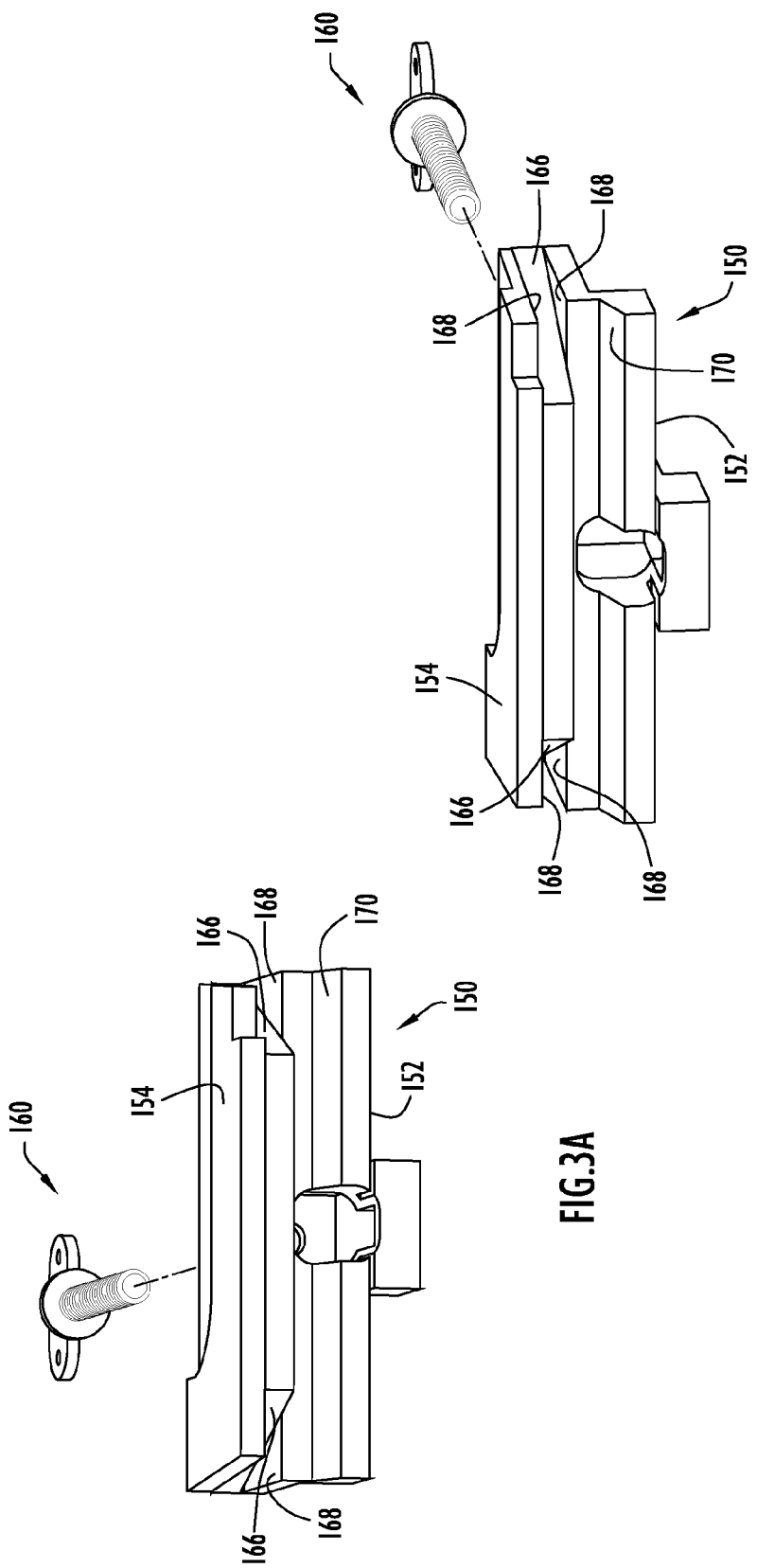
FIGS. 3A and 3B are perspective views including the rear side of the clamp used to secure the sidehat module to the radio of FIG. 1.

Referring to FIGS. 1 and 2, an expansion or sidehat module 100 is connected alongside a SINCGARS RT-1523F radio 2, where the sidehat module is supported by the radio. Both the sidehat module and the radio have a generally rectangular and parallelepiped (i.e., box-like) configuration. Radio 2 includes a front panel 4 that includes a suitable electronic display 5 and a user input interface including a touch key pad 6 that includes input keys to facilitate control and operability of the radio by a user. Front panel 4 of the radio further includes a power and control switch 7 to further control operation of the radio, and various data ports 8 that connect with suitable cables to facilitate data communication with other components as well as an antenna port 9 to facilitate connection with an antenna.

Sidehat module 100 includes a front panel 104 including data ports 108 that connect with suitable cables to facilitate data communication with other components and an antenna port 109 to connect with an antenna. As can be seen in FIG. 1, the sidehat module and radio are connected using a securing structure in the form of a clamp 150 that secures to the two components at their front ends, as described below, such that the module and radio contact and engage with each other in a side-by-side manner along complementary and engaging sidewalls 10, 110 of the components. Optionally, a slight gap can be provided between the engaging sidewalls and/or other portions at the rear ends of both the sidehat module and radio to provide a suitable tolerance between the two units that facilitates ease of installation of the sidehat module to the radio.

Referring to FIGS. 2-5, sidehat module 100 includes a securing section 112 that is disposed along engaging sidewall 110 at a front portion of the module and extends beyond front panel 104, where the securing section engages with securing structure so as to facilitate securing of the module to the radio in the manner described below. In particular, the securing section 112 of the sidehat module includes a sidewall 113 that is generally coplanar with and thus an extension of sidewall 110, and an opposing sidewall 114 that is nonparallel with sidewall 113. Sidewall 114 is angled slightly in a converging manner toward opposing sidewall 113 as sidewall 114 extends from front panel 104. Securing section 112 of the sidehat module 100 further includes an extension member generally disposed at a midpoint location along the securing section and extending slightly beyond sidewalls 113, 114 in a direction away from the front panel 104. The extension member includes an extension or finger 116 that extends transversely from sidewall 114 and is configured to engage with the securing structure in the manner described below. The extension member further includes a threaded bore 118 formed at a front surface of the extension member and extending into securing section 112 in a direction generally parallel with sidewall 113.

The radio also includes suitable structure that facilitates securing of the sidehat module to the radio using the securing structure. In particular, radio 2 includes angled protrusions or bracket members that are integral with the radio chassis or housing and extend from the four corners of the radio front panel 4. Each bracket member includes a first wall that extends in a generally coplanar manner with a sidewall of the radio and a second wall that is transverse and generally perpendicular to the first wall and extends in a generally coplanar manner with a top or bottom wall of the radio.

Thus, there are upper and lower bracket members 20 disposed at the two corners adjacent sidewall 10 of the radio (i.e., the radio sidewall that engages the sidehat module), where each bracket member includes a first wall 22 that is generally coplanar with sidewall 10 and a second wall 23 that is generally coplanar with a top wall 12 or a bottom wall 14 of the radio. The first wall 22 of each bracket member 20 includes an upper or lower edge 24 that is nonparallel in orientation with respect to second wall 23, such that the upper or lower edge extends in an angled or ramped direction toward second wall 23 as the first wall 22 extends from the front panel 4 of the radio. Accordingly, the lower edge 24 of the upper bracket member 20 and the upper edge 24 of the lower bracket member 20 are ramped in divergent orientations with respect to each other as the upper and lower edges extend away from the front panel 4 of the radio.

The securing structure includes a single clamp that can be removably fit around portions of each of the radio and sidehat module to firmly secure the two components to each other. Clamp 150 has an irregular, multi-faceted shape that includes a multi-faceted first side section 152 that faces away from radio 2 and a second side section 154 that faces away from sidehat module 100 when the clamp is installed and the module and radio are secured to each other. As can best be seen from FIGS. 3A and 3B, a rear section of clamp 150 is open and includes a plurality of surfaces internal to the clamp that define channels in which portions of each of the radio and module engage and are secured when the clamp is installed as described below. The first side section 152 of the clamp includes an opening 156 (see FIG. 2) that communicates with the open rear section of the clamp and is suitably aligned on the clamp and suitably dimensioned to receive finger 116 when the clamp is fit over portions of securing section 112 of the sidehat module.

An opening 158 is provided at a front section of the clamp which defines a passage extending through and between the front and rear sections of the clamp. The opening 158 is suitably aligned on the clamp and suitably dimensioned to facilitate insertion of a thumbscrew 160 through the clamp for engagement with the threaded bore 118 defined at the securing section 112 of the sidehat module. The thumbscrew 160 has a generally "T" shaped configuration and includes a male threaded section 162 that engages with the female threads of the threaded bore 118 and an elongated head 164 configured to be gripped by the user to facilitate rotation of the thumbscrew and threaded engagement of the thumbscrew with the threaded bore during installation of the clamp. While a thumbscrew is shown in the embodiment of FIGS. 1-7, it is noted that the invention is not limited to such a fastener. Rather, any suitable adjustable tightening fastener can be used secure the clamp to the sidehat module and radio.

As noted above, the rear section of the clamp is open to expose channeled sections that are defined by internal surfaces within the clamp that engage with various portions of the radio and the sidehat module when the clamp is installed. In particular, clamp 150 includes channel sections disposed at upper and lower ends of the clamp that extend from the front section of the clamp to an interior portion of the clamp. The upper and lower channel sections are defined by vertically angled or ramped surfaces 166 disposed between vertically aligned internal sidewalls 168 of the bracket, where the ramped surfaces 166 of the upper and lower channel sections extend toward each other in a direction away from the front section of the clamp. In other words, the ramped surface 166 of the upper channel section is angled downward toward the lower end of the clamp as it extends away from the front section of the clamp, whereas the ramped surface 166 of the lower channel section is angled upward toward the upper end of the clamp as it extends away from the front section of the clamp. The vertically ramped surfaces 166 of the clamp are complementary to the ramped edges 24 of the upper and lower brackets 20 disposed on the radio.

The clamp is suitably dimensioned such that, when the clamp is secured with the radio such that its first side section 152 faces away from radio 2, a portion of the clamp including the second side section 154 fits between the second walls 23 of the upper and lower bracket members 20 disposed adjacent radio sidewall 10 and some or all of the first wall 22 of each bracket member fits snugly within the corresponding channel of the clamp that is defined between ramped surface 166 and internal side walls 168. When the clamp is installed in this manner, at least a portion of each of the vertically ramped surfaces 166 of the clamp engages with the complementary upper and lower ramped edges 24 of the radio brackets 20. In addition, while not shown in the drawings, the clamp may further be suitably dimensioned and configured such that, upon complete installation, at least some upper and lower outer surface portions of the clamp sidewall 154 engage with complementary upper and lower surface portions of the second walls 23 of the brackets 20.

Optionally, the internal sidewalls 168 of upper and lower channel sections of the clamp 150 can further be parallel or nonparallel with respect to each other. If the sidewalls 168 are nonparallel with respect to each other, they are preferably aligned so as to converge or extend toward each other in a direction away from the rear side of the clamp, thus facilitating a more snug connection and fit of the bracket sidewalls 22 within the upper and lower channel sections as the thumb screw 160 is tightened and the clamp is further forced upon and secured to the radio and sidehat module during installation of the clamp.

Clamp 150 further includes an internal sidewall section 170 extending from a rear section of the clamp between upper and lower ends of the clamp, where sidewall section 170 faces toward radio 2 when the clamp is installed. Internal sidewall section 170 is suitably aligned on clamp 150 and suitably dimensioned to engage with sidewall 114 of the sidehat module securing section 112 when the clamp is installed. In addition, internal sidewall section 170 is angled in a complementary manner with respect to sidewall 114 of the sidehat module so as to facilitate a snug frictional fit between these two surfaces when the clamp is installed and firmly secured to the sidehat module and radio.

Thus, clamp 150 includes a plurality (i.e., at least two) of angled surfaces in different spatial dimensions (i.e., the ramped surfaces 166 that extend at a vertical angle between front and rear sections of the clamp, and the angled sidewall section 170 that extends between upper and lower sections of the clamp) that are complementary with angled surfaces of the sidehat module and the radio. Providing these complementary angled surfaces in different spatial dimensions facilitates effective clamping force between the radio and the module in different spatial dimensions at the front ends of the module and radio. This clamping feature, which generates compression forces in at least two different spatial directions in relation to the sidehat module, effectively secures the components together.

Figure 4:
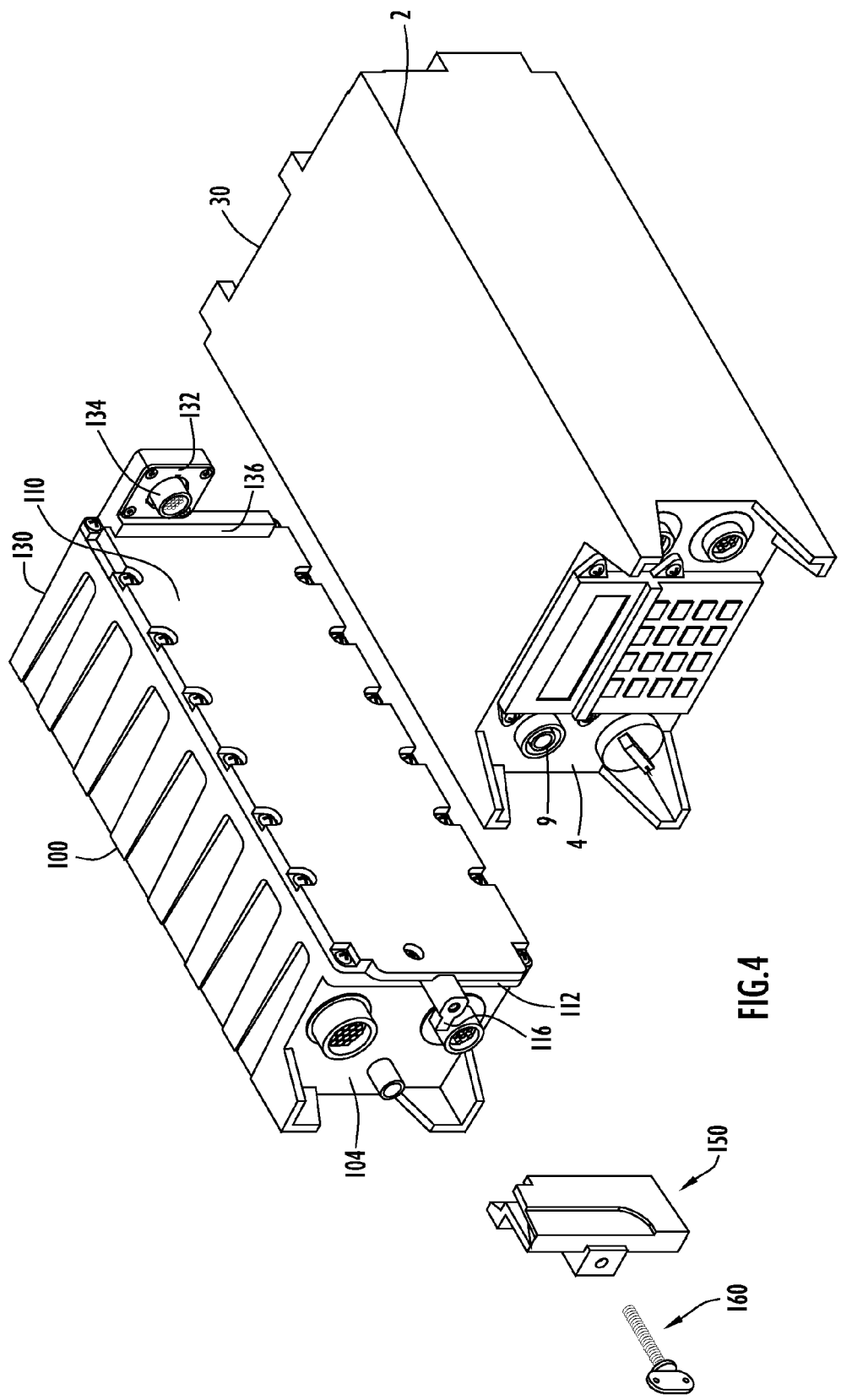
FIG. 4 is a view in perspective of the sidehat module, clamp and radio of FIG. 1, which shows the electrical mating connector of the sidehat module.
Figure 5:
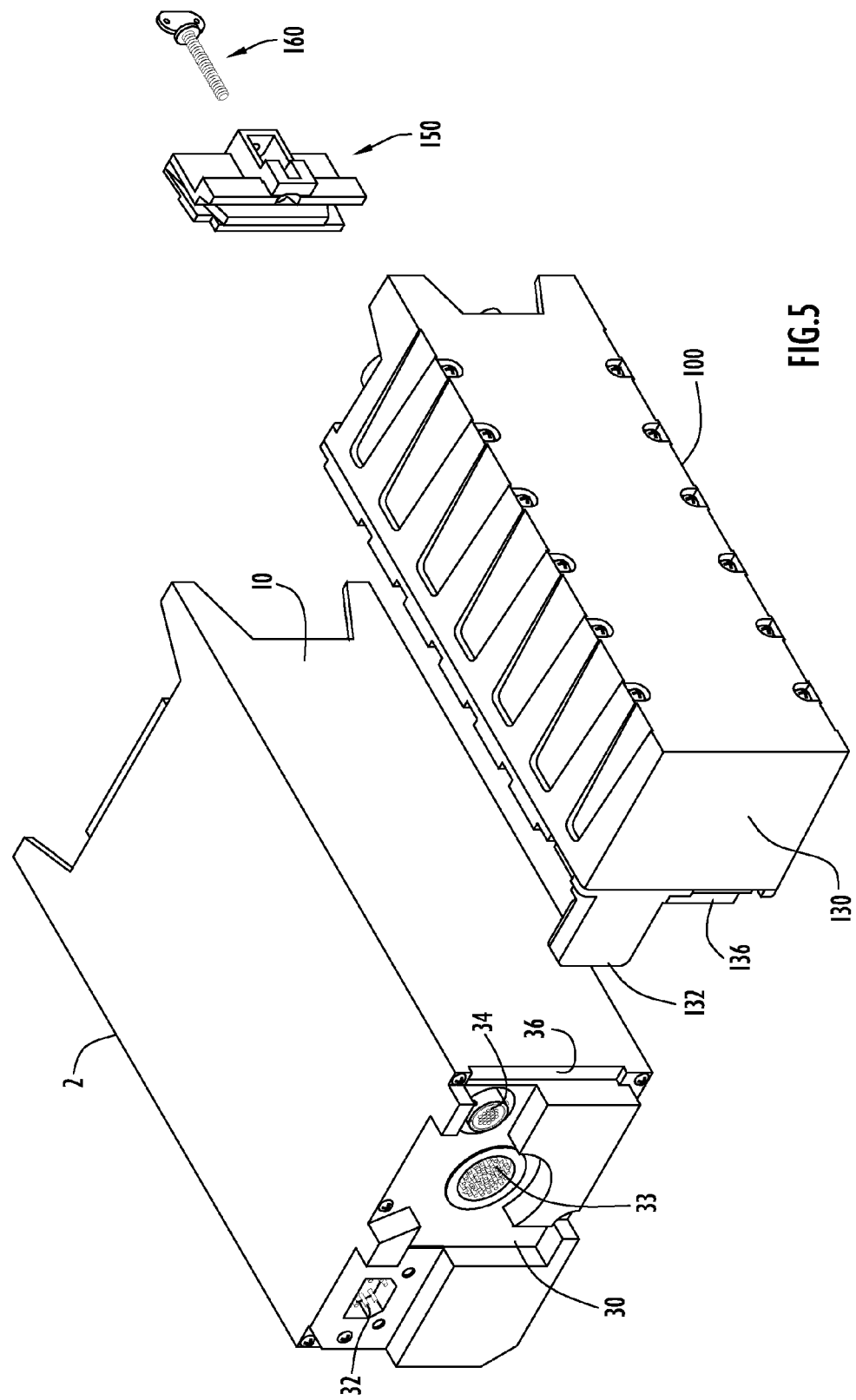
FIG. 5 is a view in perspective from the rear panels of the sidehat module and radio of FIG. 1.

Referring to FIGS. 4 and 5, each of the sidehat module and radio includes an electrical connector that is configured to mate with the other connector. The rear panel 30 of radio 2 includes two connection ports 32, 33 that interface with the vehicular mount (e.g., for data communication and power). In legacy radios, a connection port 34 is configured to connect with a suitable cable when the radio is removed from the mount (e.g., in a manpack configuration). In accordance with the present invention, data connection port 34 is further used to electrically connect to a sidehat module when installed in the vehicular mount. In particular, data connection port 34 is disposed at an upper location on the rear panel 30 near sidewall 10 and includes a series of sockets that are configured to receive contact pins of a connecting cable in a male/female mating connection.

The sidehat module includes a mounting plate 132 extending transversely from sidewall 110 at an upper and rear location of the module such that a rear surface of the mounting plate is generally coplanar with a rear panel 130 of the module. A data connection port 134 is disposed on and extends from mounting plate 132 in a direction toward the front panel 104 of the module. The data connection port 134 is suitably aligned and configured with contact pins to connect with data connection port 34 of the radio. In addition, an elongated and generally rectangular plate 136 is connected to sidewall 110 and extends in a direction between upper and lower sidewalls of the sidehat module. The rectangular plate 136 is further disposed at a location that is adjacent mounting plate 132 and also forward in relation to the mounting plate (i.e., the rectangular plate is disposed between the mounting plate and front panel 104 of the sidehat module). The rectangular plate is further suitably dimensioned and suitably aligned on module sidewall 110 to engage with a corresponding rectangular cut-out section or step 36 disposed at the corner of sidewall 10 and rear panel 30 of the radio when the sidehat module is secured to the radio.

The rectangular plate acts as a positive mechanical stop between the radio and sidehat module when the thumbscrew of the clamp is tightened to firmly secure these two components together. In particular, the rectangular plate provides a bearing surface or point of contact between the radio and sidehat at their rear ends when torque is applied to the thumbscrew to tighten the clamp at the front end of the two components. In addition, the rectangular plate provides a compression stop for the mating connection ports of the radio and sidehat module, with the radio and sidehat module bearing the forces at their rear ends at this stop location rather than at the electrical mating connection (i.e., so as to keep any loads or stress off the electrical connection between the mating connection ports). Further, the rectangular plate is formed of a suitable metal material that provides a metal to metal contact surface between the radio and sidehat module and thus an electrical ground between the two electronic components.

It will further be appreciated that the sidehat module is suitably dimensioned, with the same or similar length as the radio, so as to facilitate appropriate alignment between the two components to achieve the electrical connection between their mating connection ports at their rear ends when the clamp is secured at their front ends. The sidehat module is suitably dimensioned and configured with suitable tolerances for the channels and various engaging surfaces of the clamp and module such that the sidehat module can be easily fastened or secured to an existing radio, without the requirement of modifying or replacing the existing mounting equipment or supporting structure for the existing radio.

Figure 6:
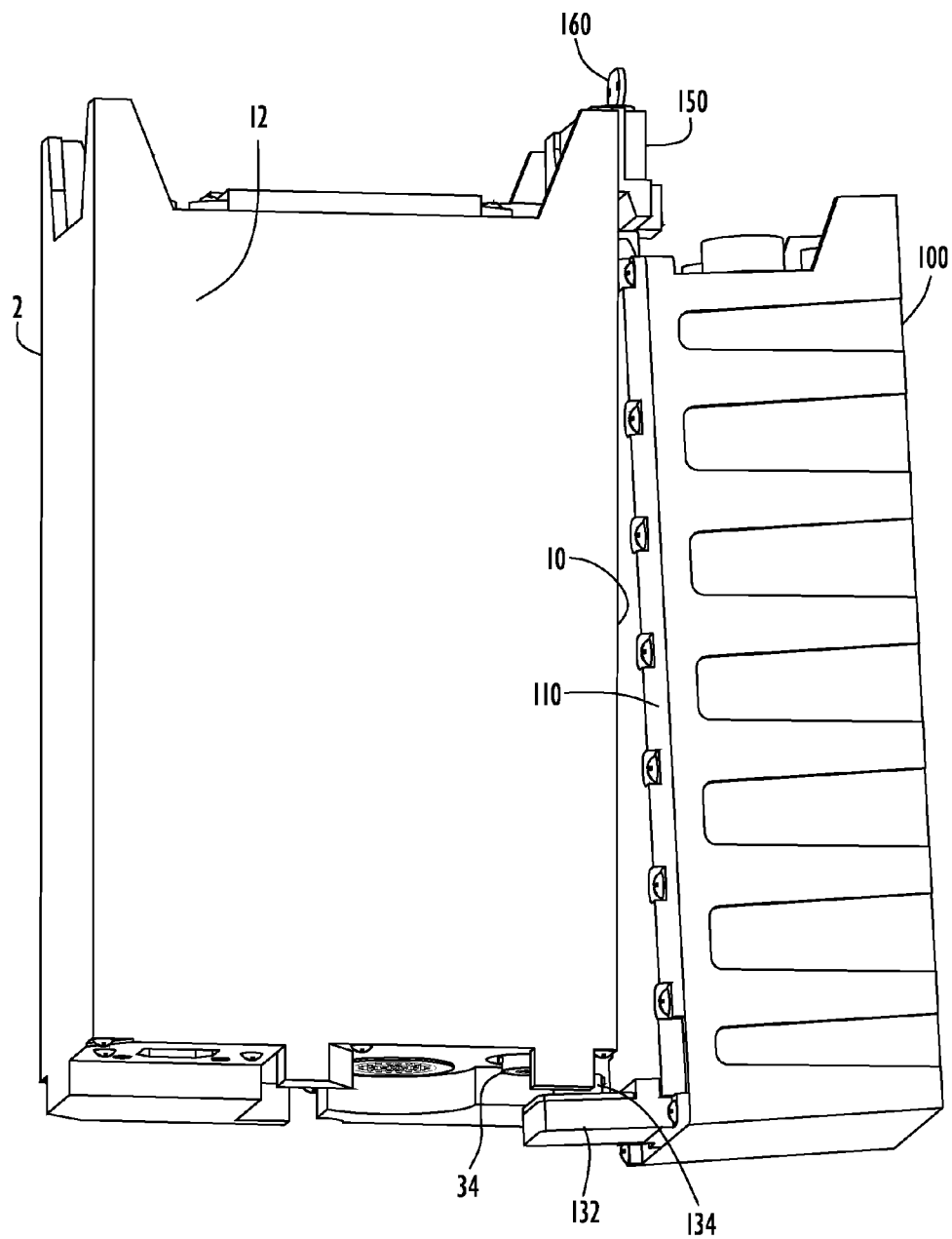
FIGS. 6 and 7 are top plan views of the sidehat module, radio and clamp during assembly of the sidehat module with the radio.
Figure 7:
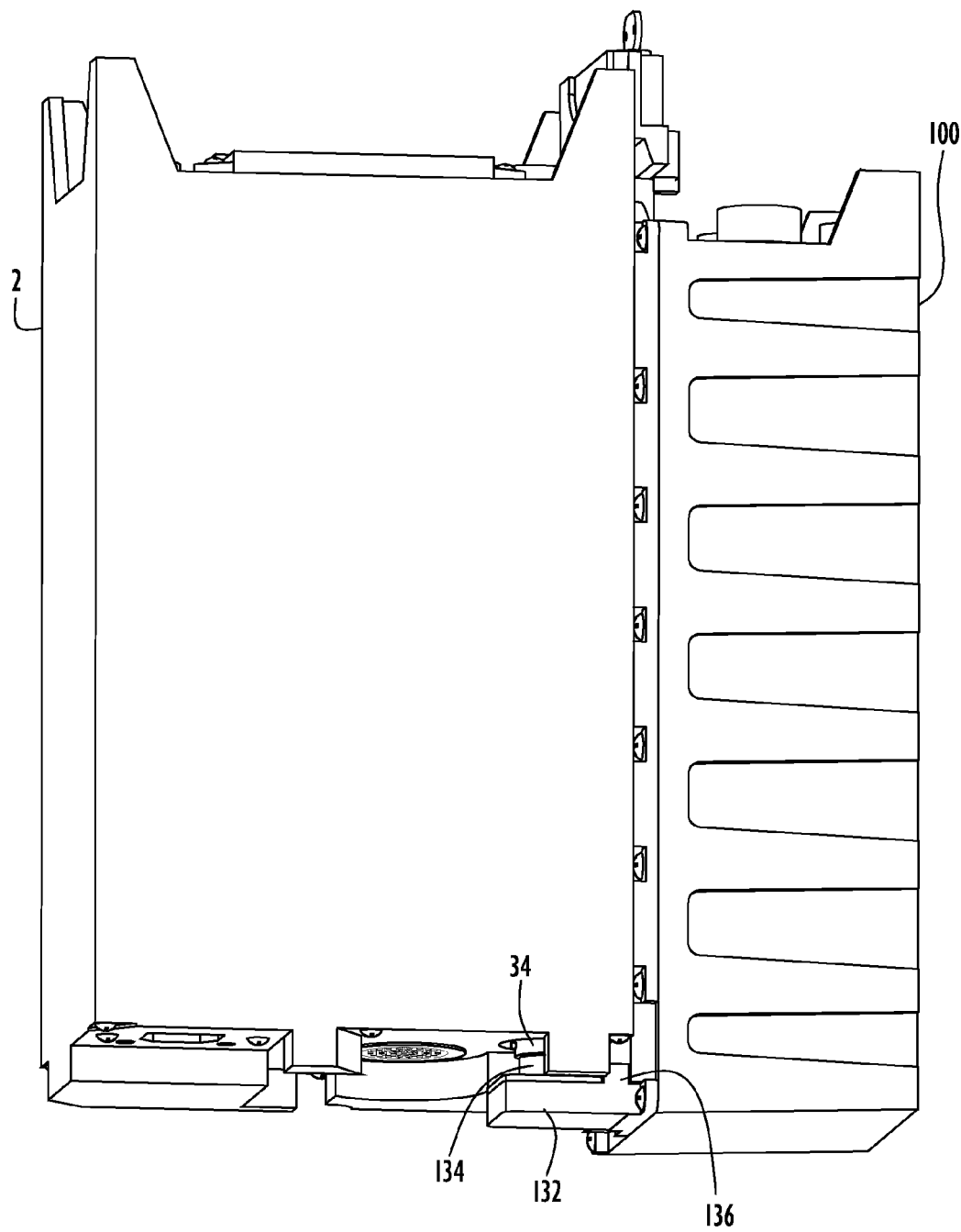

Securing of the sidehat module described above to a radio is now described with reference to FIGS. 6, 7 and 1. Initially, clamp 150 can be loosely secured around securing section 112 of sidehat module 100 by aligning the rear section of the clamp toward the module and inserting finger 116 through opening 156 of the clamp such that clamp opening 158 is aligned with threaded bore 118 on the extension member of the securing section. The male threaded section 162 of thumbscrew 160 is then inserted through clamp opening 158 and the thumbscrew is turned to secure the thumbscrew and clamp to the sidehat module. Alternatively, and more preferably, the thumbscrew is captively secured to the clamp (i.e., not removable from clamp opening 158) such that, upon securing the clamp around the securing section of the sidehat module, the thumbscrew is aligned to threadingly engage with the threaded bore of the securing section. The thumbscrew is turned only a sufficient number of times so as to ensure a loose connection exists between the clamp and the module, where there is some slight adjustment or "wiggle room" allowed for the clamp with respect to the securing section and finger of the module to facilitate alignment of the clamp with the bracket members of the radio.

Upon loosely securing the clamp to the sidehat module, the module with clamp is brought into engagement with the radio by aligning portions of engaging sidewalls 10, 110 of the two components and sliding portions of the clamp rear section between the second walls 23 of the radio bracket members 20 such that the first walls 22 of the bracket members are inserted into the upper and lower channels of the clamp (which are defined between internal side walls 168) and the ramped edges 24 of the bracket members begin to engage with the corresponding ramped surfaces 166 in the clamp channels. As can be seen in FIG. 6, the module is aligned in a nonparallel manner with the radio, with the complementary and engaging sidewalls of the two components being slightly separated at their rear ends. Once the clamp is secured to the mounting brackets of the radio, module 100 is slid in a rearward direction with respect to radio 2 until mounting plate 132 clears the rear panel 30 and connection port 34 of the radio.

Upon achieving such clearance, the rear end of module 100 is brought toward radio 2 such that both components are substantially parallel with respect to each other. The module is then moved forward slightly so as to align the front and rear ends of the two components (see FIG. 7). The dimensions and tolerances of the two components are such that, upon achieving such alignment of the front ends of the sidehat module with the radio, connection ports 34 and 134 at the rear ends of the components have sufficiently mated with each to provide an electrical connection between the components. Clamp 150 can now be firmly secured at the front ends of the components by applying sufficient torque to thumbscrew 160.

As the thumbscrew is tightened by the hand of the installer, the clamp is forced into further contact with both the radio and the sidehat module, with first walls 22 of the radio bracket members 20 extending further into the clamp channels and the ramped edges 24 of the bracket member first walls continuing to slide in frictional engagement along the clamp ramped surfaces 166. In addition, the angled sidewall 114 of the sidehat module securing section 112 frictionally engages with angled internal sidewall section 170 of the clamp.

Thus, upon tightening the clamp with each successive turn of the thumbscrew, the angled surfaces of the radio, sidehat module and clamp further engage with each other until the clamp is fully drawn into a tight, securing relationship with the radio and the module. In addition, the design of the different angled surfaces of both the clamp and the module facilitate the application of compressive or clamping forces in at least two different spatial dimensions in relation to the radio, the sidehat module and the clamp when the clamp is firmly secured to these components, where the compressive forces are oriented at directions transverse complementary and engaging angled surfaces of the clamp, the radio and the sidehat module.

Further, upon sufficient application of torque to the thumbscrew and sufficient tightening of the clamp upon the radio and module, the rectangular plate 136 at the rear end of module 100 engages with the cut-out or step 36 at the rear end 30 of the radio. This engagement provides a mechanical stop and resultant compressive force that is oriented in a direction parallel with the radio and module sidewalls 10, 110 and is resistant to further torque applied to the thumbscrew.

The combined action of the clamping structure at the front end of the components (which applies compressive forces in at least two different dimensions with respect to the radio and sidehat module) with the compressive stop force at the rear end of the components results in a highly effective fastening or securing of the sidehat module to the radio. In addition, the mechanical stop feature at the rear ends of the components effectively reduces or eliminates stresses from acting upon the data connection ports connected at the rear ends of the components.

Thus, the physical interface between the sidehat module and the radio does not interfere with installation of the radio to its mount nor does it require any support or direct interface to that mount. While the radio is removed from the mount to facilitate securing of the sidehat module to the radio, the mount for the radio does not need to be removed from its secured location (e.g., within a vehicle) in order to re-mount the radio with sidehat module to the mount. The module can further be designed to derive power and user control from the electrical connection to the radio. In addition, the securing features as described above provide a robust and highly effective fastening of the module to the radio that facilitates operation of both components in severe and extreme environments (e.g., in severe military environments) with high vibrational and/or other forces being applied to the components without the risk of mechanical or electrical separation occurring between the two components.

As noted above, the sidehat module is further very easy to mount to the radio, where the installation can be performed by the user using a single fastener or clamp that installs at the front end of the module and without the requirement of any tool or other equipment. Effective installation and tightening of the clamp can be achieved simply by hand operation in the form of torque applied to the thumbscrew.

In addition, since the sidehat module is firmly secured to the device in a side-by-side relationship, where the corresponding sides of the components are pressed together, removal of the module from the device will be achieved with the module being slid from the device while the module is substantially parallel with the device. Further, the connection ports are fully separated before the module and clamp are fully detached from the electronic device. This places less stress upon the electronic mating ports at the rear panels of the components during disassembly, so as to reduce or diminish the potential for damage to either mating port during removal of the module from the device.

As noted above, the expansion module and connection features of the present invention can be applied to any communication or other electrical device. The expansion module can include any suitable hardware and/or electronic circuitry that facilitates communication with the device to which it is mechanically and electrically connected so as to enhance, expand or modify the functions or operation of the device in any suitable manner. Alternatively, the module can be configured as a battery pack that is removably secured to some electronic device.

The expansion module can be easily and quickly installed with the existing device and further removed by hand, without any tools or special equipment, and without taking the device out of its particular field of operation. In addition, the easy connection features of the module facilitate easy disassembly and interchangeability of the module with different devices. For example, an expansion module can be easily disassembled and removed from one radio unit in the field and easily assembled with another radio unit also in the field during a particular operation.

Having described exemplary embodiments of connecting a system module to an existing electronic device, variations and changes will be suggested to those skilled in the art in view of the teachings set forth herein. It is therefore to be understood that all such variations, modifications and changes are believed to fall within the scope of the present invention as defined by the appended claims.

What is claimed:

1. A system configured to be secured to an electronic device, the electronic device including a first end, a second end that opposes and faces away from the first end and includes a connection port, and opposing side surfaces that extend between the first and second ends of the electronic device, the system comprising:
   a module including a first end, a second end that opposes and faces away from the first end of the module, opposing side surfaces that extend between the first and second ends of the module, and a bottom surface extending between the opposing side surfaces, the module further including a connection port disposed at the second end of the module and that is configured to connect with the connection port disposed at the second end of the electronic device; and
   a securing structure securable to a portion of the first end of the module and a portion of the first end of the electronic device to facilitate attachment of the module alongside the electronic device such that a side surface of the module engages a corresponding side surface of the electronic device, the connection port of the module connects with the connection port of the electronic device, and the module is supported by the electronic device when the electronic device is mounted to a support structure with the bottom surface of the module being free of any support by any structure and the module being suspended in a side-by-side alignment with the electronic device;
   wherein connection of the connection port of the module with the connection port of the electronic device establishes an electrical connection between the module and the electronic device; and
   wherein the connection port of the module includes a connection member that extends transversely from the side surface of the module that engages with the corresponding side surface of the electronic device and also connection elements that extend transversely from the connection member and in a direction toward the first end of the module so as to engage with corresponding connection elements of the connection port for the electronic device when the connection ports of the module and electronic device are connected together.

2. The system of claim 1, wherein the securing structure comprises a clamp that secures to portions of the first ends of the module and the electronic device, and the clamp includes a plurality of angled surfaces that are configured to provide compressive forces between the electronic device and the module when the securing structure is secured to the module and electronic device, the compressive forces being oriented in a plurality of different spatial dimensions in relation to the clamp.

3. The system of claim 2, wherein the clamp includes a securing member comprising a screw that extends through the clamp and engages with a threaded bore disposed on the module.

4. The system of claim 3, wherein the threaded bore is disposed on a securing section of the module, and the securing section of the module further includes a transversely extending member that extends through an opening in the clamp when the clamp is secured to the module.

5. A system that is expandable to enhance operability of the system, the system comprising:

an electronic device comprising a radio and including a first end, a second end that opposes and faces away from the first end and includes a connection port, and opposing side surfaces that extend between the first and second ends of the electronic device;

a module including a first end, a second end that opposes and faces away from the first end of the module, opposing side surfaces that extend between the first and second ends of the module, and a bottom surface extending between the opposing side surfaces, the module further including a connection port disposed at the second end of the module and that is configured to connect with the connection port of the electronic device; and a securing structure securable to a portion of the first end of the module and a portion of the first end of the electronic device to facilitate attachment of the module alongside the electronic device such that a side surface of the module engages a corresponding side surface of the electronic device, the connection port of the module connects with the connection port of the electronic device, and the module is supported by the electronic device when the electronic device is mounted to a support structure with the bottom surface of the module being free of any support by any structure and the module being suspended in a side-by-side alignment the electronic device;

wherein connection of the connection port of the module with the connection port of the electronic device establishes an electrical connection between the module and the electronic device; and wherein the connection port of the module includes a connection member that extends transversely from the side surface of the module that engages with the corresponding side surface of the electronic device and also connection elements that extend transversely from the connection member and in a direction toward the first end of the module so as engage with corresponding connection elements of the connection port for the electronic device when the connection ports of the module and electronic device are connected together.

6. The system of claim 5, wherein the module comprises an expansion module including suitable electronic circuitry that is configured to communicate with a communication device to facilitate an exchange of data between the expansion module and the communication device upon connecting the connection port of the module with the connection port of the communication device.

7. The system of claim 5, wherein the securing structure comprises a clamp that secures to portions of the first ends of the module and the electronic device, and the clamp includes a plurality of angled surfaces that are configured to provide compressive forces between the electronic device and the module when the securing structure is secured to the module and electronic device, the compressive forces being oriented in a plurality of different spatial dimensions in relation to the clamp.

8. A method of securing a module to an electronic device, the electronic device including a first end, a second end that opposes and faces away from the first end and includes a connection port, and opposing side surfaces that extend between the first and second ends of the electronic device, and the module including a first end, a second end that opposes and faces away from the first end of the module, opposing side surfaces that extend between the first and second ends of the module, a bottom surface extending between the opposing side surfaces, and a connection port disposed at the second end of the module and that is configured to connect with the connection port of the electronic device, the method comprising:

aligning the first end of the module with the first end of the electronic device; and securing the module to the electronic device with securing structure that engages with portions of the first ends of the module and the electronic device;

wherein, upon attaching the module to the electronic device with the securing structure, a side surface of the module engages with a corresponding side surface of the electronic device with the bottom surface of the module being free of any support by any structure such that the module is suspended in a side-by-side alignment with the electronic device, and the connection port of the module connects with the corresponding connection port of the connection device so as to establish an electrical connection between the module and the electronic device; and wherein the connection port of the module includes a connection member that extends transversely from the side surface of the module that engages with the corresponding side surface of the electronic device and also connection elements that extend transversely from the connection member and in a direction toward the first end of the module so as to engage with corresponding connection elements of the connection port for the electronic device when the connection ports of the module and electronic device are connected together.

9. The method of claim 8, wherein the method further comprises:

aligning the module with the electronic device such that the connection port of the module is located a distance beyond the second end of the electronic device; and moving the connection port of the module in a direction toward the second end of the electronic device so as to engage the connection port of the module with the connection port of the electronic device.

10. The method of claim 8, wherein the securing structure comprises a clamp that secures to portions of the first ends of the module and the electronic device, and the clamp includes a plurality of angled surfaces that provide compressive forces between the electronic device and the module when the securing structure is secured to the module and electronic device, the compressive forces being oriented in a plurality of different spatial dimensions in relation to the clamp.

11. The method of claim 10, wherein the clamp includes at least one channel including an angled surface that engages with a corresponding angled surface disposed on the electronic device when the clamp is secured to the electronic device and the module.

12. The method of claim 10, wherein the clamp further includes a screw that extends through the clamp and the module includes a threaded bore, and the securing of the clamp to portions of the first ends of the module and the electronic device includes:

engaging the screw with the threaded bore; and rotating the screw into the threaded bore to secure the clamp to the module and the electronic device.

13. The method of claim 12, wherein the threaded bore is disposed on a securing section of the module, and the securing section of the module further includes a transversely extending member that extends through an opening in the clamp when the clamp is secured to the module.

14. The method of claim 8, wherein the electronic device comprises a communication device, and the module comprises an expansion module including suitable electronic circuitry that is configured to communicate with the communication device to facilitate an exchange of data between the expansion module and the communication module upon connecting the connection port of the module with the connection port of the communication device.

* * * * *